(12) United States Patent
Keating et al.

(10) Patent No.: US 10,523,894 B2
(45) Date of Patent: Dec. 31, 2019

(54) AUTOMATED SELECTION OF KEEPER IMAGES FROM A BURST PHOTO CAPTURED SET

(71) Applicant: Apple Inc., Cupertino, CA (US)

(72) Inventors: Brett Keating, San Jose, CA (US); Vincent Wong, Santa Clara, CA (US); Todd Sachs, Palo Alto, CA (US); Claus Molgaard, Los Gatos, CA (US); Michael Rousson, Palo Alto, CA (US); Elliott Harris, San Francisco, CA (US); Justin Titi, Morgan Hill, CA (US); Karl Hsu, Cupertino, CA (US); Jeff Brasket, San Francisco, CA (US); Marco Zuliani, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 237 days.

(21) Appl. No.: 15/266,460

(22) Filed: Sep. 15, 2016

(65) Prior Publication Data

US 2017/0006251 A1    Jan. 5, 2017

Related U.S. Application Data

(63) Continuation of application No. 14/021,857, filed on Sep. 9, 2013, now abandoned.

(51) Int. Cl.
*H04N 5/77* (2006.01)
*G06K 9/00* (2006.01)
(Continued)

(52) U.S. Cl.
CPC ........... *H04N 5/77* (2013.01); *G06K 9/00765* (2013.01); *G06K 9/46* (2013.01); *G06K 9/6201* (2013.01);
(Continued)

(58) Field of Classification Search
CPC ........... H04N 21/8456; H04N 21/8549; H04N 5/23293; H04N 5/23222; H04N 5/23219;
(Continued)

(56) References Cited

U.S. PATENT DOCUMENTS 5,646,521 A    7/1997 Rosenthal
5,920,657 A    7/1999 Bender
(Continued)

FOREIGN PATENT DOCUMENTS

CN    1545062 A    11/2004
CN    102209196 A    10/2011
(Continued)

OTHER PUBLICATIONS

Ewerth, Ralph, and Bernd Freisleben. "Video cut detection without thresholds." Proc. of 11th Workshop on Signals, Systems and Image Processing. 2004. (Year: 2004).*
(Continued)

*Primary Examiner* — Wesley J Tucker
(74) *Attorney, Agent, or Firm* — Blank Rome LLP (57) ABSTRACT

Systems and methods for improving automatic selection of keeper images from a commonly captured set of images are described. A combination of image type identification and image quality metrics may be used to identify one or more images in the set as keeper images. Image type identification may be used to categorize the captured images into, for example, three or more categories. The categories may include portrait, action, or "other." Depending on the category identified, the images may be analyzed differently to identify keeper images. For portrait images, an operation may be used to identify the best set of faces. For action images, the set may be divided into sections such that keeper images selected from each section tell the story of the action. For the "other" category, the images may be analyzed such
(Continued)

that those having higher quality metrics for an identified region of interest are selected.

23 Claims, 7 Drawing Sheets

(51) Int. Cl.
| | |
|---|---|
| *H04N 21/845* | (2011.01) |
| *G06K 9/46* | (2006.01) |
| *G06K 9/62* | (2006.01) |
| *H04N 5/232* | (2006.01) |
| *H04N 5/14* | (2006.01) |
| *G06T 7/11* | (2017.01) |

(52) U.S. Cl.
CPC .............. *G06K 9/6267* (2013.01); *G06T 7/11* (2017.01); *H04N 5/147* (2013.01); *H04N 5/23222* (2013.01); *H04N 5/23293* (2013.01); *H04N 21/8456* (2013.01); *G06K 2009/4666* (2013.01); *H04N 5/23219* (2013.01); *H04N 5/23229* (2013.01)

(58) Field of Classification Search
CPC ...... H04N 5/23229; H04N 5/77; H04N 5/147; G06K 9/00751; G06K 9/00765; G06K 9/6201; G06K 9/6267; G06K 9/46; G06K 2009/4666; G06F 17/30843; G06T 7/11; G06T 7/215; G06T 7/38
USPC .......................................................... 382/305
See application file for complete search history.

(56) References Cited

U.S. PATENT DOCUMENTS

| | | | |
|---|---|---|---|
| 6,271,847 | B1 | 8/2001 | Shum |
| 6,301,440 | B1 | 10/2001 | Bolle |
| 6,549,643 | B1 | 4/2003 | Toklu |
| 6,552,744 | B2 | 4/2003 | Chen |
| 7,130,864 | B2 | 10/2006 | Lin |
| 7,424,218 | B2 | 9/2008 | Baudisch |
| 7,602,418 | B2 | 10/2009 | Border |
| 7,639,741 | B1 | 12/2009 | Holt |
| 7,688,379 | B2 | 3/2010 | Forman |
| 7,742,083 | B2 | 6/2010 | Fredlund |
| 7,839,429 | B2 | 11/2010 | Williams |
| 7,856,120 | B2 | 12/2010 | Porikli |
| 7,929,853 | B2 | 4/2011 | Park |
| 7,991,196 | B2 | 8/2011 | Tener |
| 8,018,999 | B2 | 9/2011 | Yao |
| 8,023,000 | B2 | 9/2011 | Tamaru |
| 8,189,051 | B2 | 5/2012 | Shih |
| 8,335,400 | B2 | 12/2012 | Kobayashi |
| 8,699,822 | B2 | 4/2014 | Park |
| 2003/0184778 | A1 | 10/2003 | Chiba |
| 2005/0228849 | A1 | 10/2005 | Zhang |
| 2006/0210166 | A1 | 9/2006 | Takemoto |
| 2006/0257048 | A1 | 11/2006 | Lin |
| 2007/0074115 | A1* | 3/2007 | Patten ................. G11B 27/032 715/716 |
| 2007/0182861 | A1 | 8/2007 | Luo |
| 2007/0222864 | A1 | 9/2007 | Hiraga |
| 2007/0263128 | A1* | 11/2007 | Zhang ................... G11B 27/28 348/700 |
| 2008/0037869 | A1* | 2/2008 | Zhou ..................... H04N 5/145 382/173 |
| 2008/0166115 | A1 | 7/2008 | Sachs |
| 2008/0170126 | A1 | 7/2008 | Tico |
| 2008/0192129 | A1 | 8/2008 | Walker |
| 2009/0115859 | A1 | 5/2009 | Lee |
| 2009/0161982 | A1 | 6/2009 | Tico |
| 2009/0169102 | A1 | 7/2009 | Zhang |
| 2009/0263028 | A1 | 10/2009 | Kwon |
| 2010/0017115 | A1 | 1/2010 | Gautama |
| 2010/0020224 | A1 | 1/2010 | Hattori |
| 2010/0053346 | A1 | 3/2010 | Mitsunaga |
| 2010/0165122 | A1 | 7/2010 | Castorina |
| 2010/0183225 | A1 | 7/2010 | Vantaram |
| 2010/0231593 | A1 | 9/2010 | Zhou |
| 2010/0271512 | A1 | 10/2010 | Garten |
| 2010/0277609 | A1 | 11/2010 | Abe |
| 2011/0038548 | A1 | 2/2011 | Rezazadeh |
| 2011/0311147 | A1 | 12/2011 | Pahalawatta |
| 2012/0069203 | A1 | 3/2012 | Voss |
| 2012/0076427 | A1 | 3/2012 | Hibino |
| 2012/0082389 | A1 | 4/2012 | Sakamoto |
| 2012/0086829 | A1 | 4/2012 | Hohjoh |
| 2012/0106925 | A1* | 5/2012 | Dirik ..................... H04N 5/147 386/240 |
| 2012/0120283 | A1 | 5/2012 | Capata |
| 2012/0121202 | A1 | 5/2012 | Wang |
| 2012/0154579 | A1 | 6/2012 | Hampapur |
| 2012/0183202 | A1 | 7/2012 | Wei |
| 2012/0201427 | A1 | 8/2012 | Jasinski |
| 2012/0218427 | A1 | 8/2012 | Wu |
| 2012/0249826 | A1 | 10/2012 | Kobayashi |
| 2012/0281924 | A1 | 11/2012 | Coulombe |
| 2012/0281969 | A1 | 11/2012 | Jiang |
| 2012/0293607 | A1 | 11/2012 | Bhogal |
| 2012/0300023 | A1 | 11/2012 | Lee |
| 2012/0306999 | A1 | 12/2012 | Zhou |
| 2013/0028509 | A1 | 1/2013 | Moon |
| 2013/0044230 | A1 | 2/2013 | Zhou |
| 2013/0148860 | A1 | 6/2013 | Musatenko |
| 2013/0208997 | A1 | 8/2013 | Liu |
| 2013/0265451 | A1 | 10/2013 | Son |
| 2014/0071299 | A1 | 3/2014 | Grundmann |
| 2014/0363087 | A1 | 12/2014 | Tico |
| 2016/0063343 | A1 | 3/2016 | Loui |

FOREIGN PATENT DOCUMENTS

| | | |
|---|---|---|
| CN | 102685386 A | 9/2012 |
| EP | 2521091 A1 | 11/2012 |
| JP | 2011229127 A | 11/2011 |
| KR | 20030058143 A | 7/2003 |
| KR | 20130013288 A | 2/2013 |
| WO | 2000013407 | 1/2000 |

OTHER PUBLICATIONS

Cotsaces, Costas, Nikos Nikolaidis, and Ioannis Pitas. "Video shot boundary detection and condensed representation: a review." IEEE signal processing magazine 23.2 (2006): 28-37. (Year: 2006).*

"Storage Device." Computer Hope, Dec. 16, 2018, https://www.computerhope.com/jargon/s/stordevi.htm. (Year: 2018).*

Zhai, Yun, and Mubarak Shah. "Video scene segmentation using Markov chain Monte Carlo." IEEE transactions on Multimedia 8.4 (2006): 686-697. (Year: 2006).*

International Search Report and Written Opinion for Internationa Application No. PCT/US2014/052965, dated Nov. 20, 2014.

Luo, Yiwen, and Xiaoou Tang, "Photo and video quality evaluation: Focusing on the subject." Computer Vision-ECCV 2008. Springer Berlin Heidelberg, 2008, 386-399.

Madiha Hussain Malik, et al.: "Wavelet Based Exposure Fusion," Lecture Notes in Engineering and Computer Science, Jul. 2, 2008 (Jul. 2, 2008), pp. 688-693, XP055132823, Retrieved from the Internet: URL: http://www.iaeng.org/publication/WCE2008/WCE2008_pp688-693.pdf [retrieved on Jul. 31, 2014].

Tico, M. et al.: "Robust Method of Digital Image Stabilization," 3rd International Symposium on Communications, Control and Signal Processing, 2008. ISCCSP 2008, IEEE, Piscataway, NJ, USA, Mar. 12, 2008 (Mar. 12, 2008), pp. 316-321, XP031269886, ISBN: 978-1-244-1687-5.

Yousefi, Siamak, M. Rahman, and Nasser Kehtarnavaz, "A new auto-focus sharpness function for digital and smart-phone cameras." Consumer Electronics, IEEE Transactions on 57.3 (2011): 1003-1009.

(56) References Cited

OTHER PUBLICATIONS

Second Office Action received in Chinese Patent Application No. 201480049340.1, dated Aug. 7, 2018.
Sonka et al: "Image Processing and Analyzing and Machine Vision," Sep. 30, 2003, pp. 268-272.
Zhao, Jianyong: "Technology of Television Application," Dec. 31, 2013, pp. 264-269.

* cited by examiner

AUTOMATED SELECTION OF KEEPER IMAGES FROM A BURST PHOTO CAPTURED SET

BACKGROUND

This disclosure relates generally to the field of digital photography. More particularly, but not by way of limitation, this disclosure relates to techniques for selecting an image from a series of images taken during a burst photo capture mode. As used herein, the burst photo capture mode refers generally to a camera setting which allows the user to capture multiple photographs in a short period of time. The multiple photographs are generally taken automatically after the user makes the selection and presses one button, and they are generally captured at a particular rate of speed. The rate of speed may be, for example, 10 photographs per second.

Typically, a user utilizes this mode for a specific reason. One such reason may be to capture an action shot, such as a child diving into a pool or blowing out birthday candles. In such instances, the user may desire to capture the event with multiple photographs that document the chronology of the event, i.e. before, during or after a specific event. However, because of the fast rate at which the events are occurring, manually capturing the exact desired moments, with individual button presses, may be very difficult. Using the burst capture mode allows the user to capture a number of photographs in a short period of time and thus increase the chances that photographs of the exact desired moments are among the ones taken. In such action photo burst captures, often after the pictures are taken, the user may decide to keep several photos, e.g. to show before, during, and after an event.

Another reason for which the user may decide to utilize the burst capture mode is to take portrait pictures of multiple people. This may happen when the user is taking a group photograph, and desires to have all of the people in the picture smiling, not blinking, and looking at the camera with an unobstructed line-of-sight view.

It is also possible that there is no particular action or people in the scene, but the user would like to be able to pick from several photographs in order to find the best photo in some aesthetic sense. Capturing photos of fountains and waterfalls are some examples of circumstances like this.

Although, the burst capture mode can be very useful for action scenes, scenes for multiple people, or for providing the option of choosing the best from multiple photo captures, it is generally not used frequently because it tends to fill up memory storage space quickly. Moreover, the many pictures taken during a burst have to be reviewed by the user to select one or more keeper pictures and that can be a time consuming and tedious task.

SUMMARY

In one embodiment a method to receive and retain a sequence of images in an image set is provided. The method includes detecting if each of the images in the sequence of images contains faces or if the scene contains action. Using the detection, the images in the set may then be classified. In one embodiment, if one or more images are detected as containing primarily faces, the images may be classified as portraits. In some embodiments, if the scene is detected as containing action, the images may be classified as action images. At least one quality metric value is then determined for each of the obtained images. The quality metric value may include, for example, sharpness values for the images. In other embodiments, the quality metric value may include blurriness metrics. After quality metric values are determined and the images are classified, one or more images are selected as keeper images from the image set. The keeper images are selected, in one embodiment, based on the classification and at least one quality metric value. After the selection has been made, the one or more keeper images may be presented to a user.

In another embodiment, a method to pre-select keeper images from a burst capture set of images includes determining if detected faces in the image sets are smiling or blinking. In one embodiment, a sharpness value for each face may also be calculated. In another embodiment, in order to determine if the scene contains action, a feature vector may be constructed from the images and used in a classifier. In some embodiments, if the images are classified as action, the sequence of images may be divided into two or more sections and one keeper image may be selected from each section.

In still another embodiment, if the image set is not detected as containing primarily faces or if action is not detected in the scene, the images may be classified as "other." In some implementations, selecting one or more keeper images from the sequence of received images comprises identifying a region of interest in the images and selecting one or more keeper images from the sequence of images based on the at least one quality metric value for the region of interest. Identifying a region of interest may include registering each two images in the sequence of images with respect to each other, comparing the registered images with each other, and identifying a region in the registered images where the differences between the registered images are larger than a specified threshold.

DETAILED DESCRIPTION

This disclosure pertains to systems, methods, and computer readable media to automatically pre-select one or more images as keeper images from multiple images taken with a burst photo capture mode. In one embodiment, a novel approach may be used to determine the reason the photographer used the burst capture mode. This may be done, for example, by analyzing the images to determine if the images contain primarily faces or if they track some action in the scene. Based on the determined reason, the burst may then be categorized as action, portrait or other.

After categorizing the burst, the approach may analyze the captured image set. Depending on the category selected, the approach may use different criteria to pre-select one or more images from the image set as keeper image(s). For a portrait burst, the approach may select one image with the most smiling, non-blinking faces. For an action burst, the operation may divide the image set into sections that each cover different stages of the action and select one keeper image from each of the sections. For a burst that is classified as other, the approach may identify a region of interest in the image set and select a keeper image that has higher quality metrics for the identified region of interest.

In one embodiment, the techniques used to pre-select the best one or more images may take advantage of some of the calculations made during normal processing of the images such that no significant post-processing time is required. This means that computations made to pre-select keeper image(s) may not be noticeable to the users, thus allowing the user to access the pre-selected images virtually instantaneously after the images are captured. In one embodiment, the calculations made during the processing of the images and the computations made to pre-select keeper images do not interfere with the burst capture frame rate. Thus not only does the user not experience any significant noticeable delay between image capture and the presentation of pre-selected keeper images, there is also no interference with the normal burst capture frame rate.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system and business related constraints), and that these goals may vary from one implementation to another. It will also be appreciated that such development efforts might be complex and time-consuming, but would nevertheless be a routine undertaking for those of ordinary skill in the design and implementation of image processing systems having the benefit of this disclosure.

Figure 1:
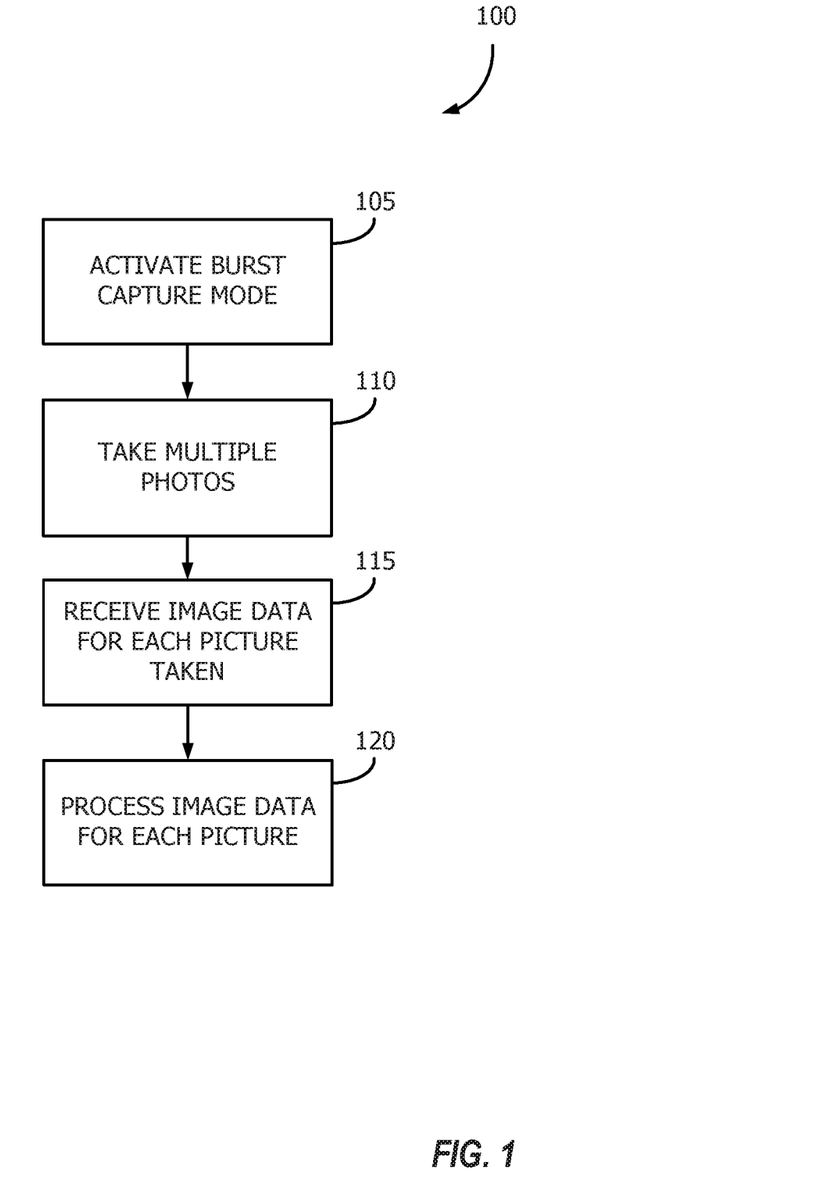
FIG. 1 shows, in flowchart form, an image burst capture operation in accordance with one embodiment.

One novel approach to pre-selecting keeper images from an image set taken during a burst capture mode is to first capture and process the images. Referring to FIG. 1, in one embodiment according to this approach operation 100 begins when a burst capture operation is activated (block 105). This may done, in one embodiment, by setting the camera mode on burst capture and pressing an image capture button. Upon activating the burst capture mode, the camera may start taking multiple photographs (block 110) and receiving image data for each photograph taken (block 115).

As used herein, the term "camera" refers to any electronic device that includes or incorporates digital image capture functionality. This includes, by way of example, stand-alone cameras (e.g., digital SLR cameras and 'point-and-click' cameras) as well as other electronic devices having embedded camera capabilities. Examples of this latter type include, but are not limited to, mobile phones, tablet and notebook computer systems, and digital media player devices.

The photographs are generally taken in a short period of time at a particular rate of speed. The number of pictures taken in a burst can vary in different embodiments. In one embodiment, the user may hold down the image capture button until finished taking pictures. The number of pictures taken, in such an embodiment, may vary depending on the image capture rate. The capture rate may be for example, 6, 8 or 10 pictures per second. In one embodiment, the user may be able to select the rate of capture. There also may be a maximum number of pictures that can be taken during each burst capture. For example, the maximum number may be 999. Other numbers are also possible. In one embodiment, the user may have the ability to select the number of pictures taken from a range of options available. For example, the user may be able to choose between 100, 200 or 500 photographs. In one embodiment, special image buffer memory may be used to retain the captured images. In another embodiment, general purpose memory may be used.

As image data is received for each photograph, the data may be processed as it is received (block 120). This occurs, in one embodiment, in real time such that the user does not notice any significant delay between capturing the images and viewing them. In general, only a limited amount of time may be available for processing the images. For example, in an embodiment in which 10 images are captured during the burst capture at a rate of 10 images per second, there may be 100 milliseconds available to receive and process each image and to conduct an analysis to pre-select keeper images. Most of the processing time is generally needed for encoding, storing the image, and maintaining in one embodiment, an interactive user interface which shows burst capture progress. Thus, the time available for performing an analysis to pre-select keeper images may be very limited. In one embodiment, the real-time data collection and processing does not take more than 35-55% of the total amount of time available. For a burst being captured at a rate of 10 images per second, that translates to 35-55 milliseconds for data collection, processing and analysis. The embodiments described in this specification are generally able to meet these time constraints.

Figure 2:
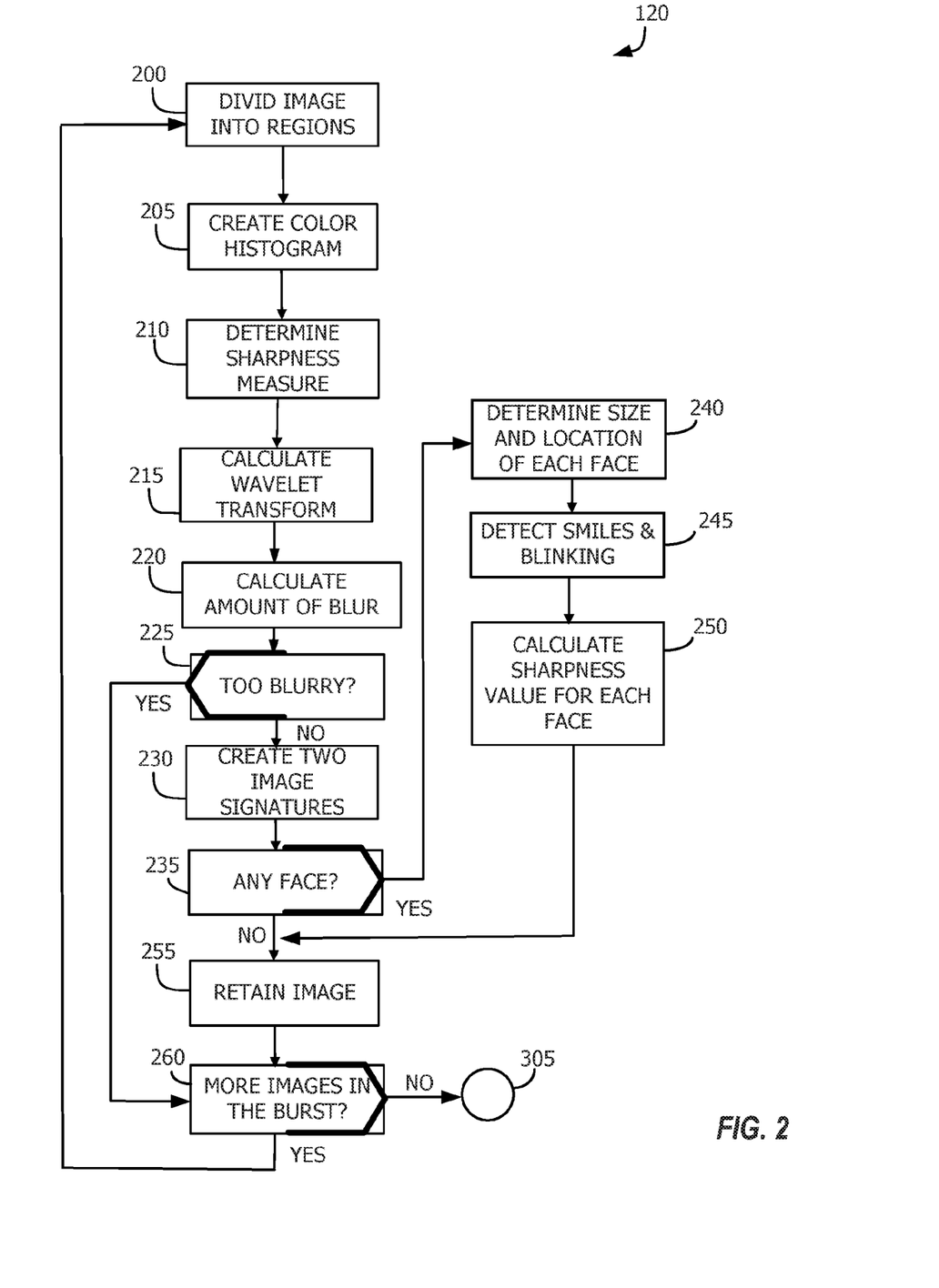
FIG. 2 shows, in flowchart form, an image processing operation in accordance with one embodiment.

Referring to FIG. 2, processing each image received in operation 120 (block 120 of FIG. 1) may begin by dividing the image into smaller regions (e.g., blocks, tiles or bands) (block 200) to make processing of the multiple calculations performed on the image faster and more efficient. In one embodiment, the blocks are 32×32. In another embodiment, the blocks are 16×16. Other variations are also possible. Alternatively, the entirety of the image is selected as one region. In one embodiment, to make processing more efficient the image may also be scaled down as is well known in the art.

After the image has been divided into smaller blocks, the blocks may be processed to determine image quality metrics in accordance with image content and/or motion sensor data (e.g., gyro and accelerometer sensors). These techniques may be used separately, or combined together, depending on the particular use case and/or system resources. In one particular embodiment, output from a camera's AF and/or AE systems may be used to generate a quality metric during normal lighting conditions while the camera's motion sensor(s) may be used during low light conditions. Quality metrics may be associated with each image directly (e.g., stored with the image as metadata) or indirectly (e.g., through a separate index or database file).

In one embodiment, the first step in processing the image and determining quality metrics may involve creating a color histogram of the image in the UV color space (block 205). In one embodiment, the color histogram may be a two dimensional histogram with the U-value as one dimension and the V-value as the other. The image may be divided into multiple regions, having Ui and Vi as the dimensions for the ith region. For example, in one embodiment, Ui may contain any U-value between 0 and 7. If a color is found which falls within Ui and Vi, a "bin" corresponding to (Ui,Vi) may be incremented. The sizes of the bins may be uniform, or they may be adjusted so that regions where color combinations are more common are represented by more bins. This may make the distribution of counts in the bins more informative. This means, for example, that because colors near the center are more common, more bins may be placed near the center by making the regions small (e.g., having fewer colors in each dimension). Away from the center, the regions may be made larger by having more colors in each dimension. This process may be referred to as block center-weighted bins. After the color histogram has been created, a quality measure indicative of the image's sharpness may be calculated (block 210). Sharpness measures may be obtained or determined from, for example, a camera's auto-focus (AF) and/or auto-exposure (AE) systems. In one embodiment, sharpness measures may be determined by calculating the sum of adjacent pixel differences. Other methods of determining sharpness are also possible. For the purposes of this disclosure, the sharper an image is judged to be, the higher its' corresponding rank (e.g., quality metric value).

After determining one or more sharpness measures, a wavelet transform may be calculated for each block (block 215) to compress the image, thus making further calculations more efficient. In one embodiment, the wavelength transform may be a Haar transform. Calculating a Haar wavelength transform is well known in the art and thus not discussed here. After calculating wavelet transforms, the amount of blur present in the image may be derived (block 220). In one embodiment, the amount of blur is derived from the wavelet transforms calculated. Other approaches are also possible. One approach to determining the amount of blur present in an image is discussed in U.S. patent application Ser. No. 13/911,873, entitled "Reference Frame Selection for Still Image Stabilization," incorporated herein by reference in its entirety.

In one embodiment, after the amount of blur present in the image has been calculated, a determination is made as to whether the image is too blurry to use (block 225). This is done, in one embodiment, by comparing the amount of blur present in the image with a predetermined threshold. If the amount of blur present in the image is above a predetermined threshold, or in some embodiments, if another calculated quality measure is below a different threshold value the image may be determined to be too blurry. Threshold values may be static or predetermined (obtained, for example, from program memory during camera start-up) or dynamic (determined, for example, based on image statistics). In one embodiment, if one or more of the quality measures of the image is significantly smaller than the maximum quality metric value of the image set, the image may be regarded as too blurry to use. In another implementation, if the quality metric of an image is smaller than the maximum quality metric value of the image set multiplied by a ratio, the image may be regarded as too blurry to use (e.g., a ratio of between 0.6 and 0.9).

Notwithstanding the approach by which blurriness is determined, if the image is determined to be too blurry (YES prong of block 225), the image may be discarded or otherwise removed from further consideration and a check may be made to determine if at least one more received image remains to be processed (block 260). If the image is not too blurry to use (NO prong of block 225), two one dimensional signatures may be calculated (block 230) for the image. The signatures may be functions of the vertical and horizontal projections of the image. In one embodiment, the signatures are vertical and horizontal sums of pixel values.

The next step in processing the image, in some implementations, may be determining whether or not the image contains faces. Face recognition techniques are well known in the art and thus not discussed in this specification. Using a face recognition algorithm, the operation may detect if there are faces in the image (block 235). If no faces are detected in the image (NO prong of block 235), the image may be retained (block 255), whereafter a check can be made to determine if all of the images from the set have been received (block 260) and, if yes, continue to block 305 of FIG. 3 to classify the image set. If at least one more image remains to be received (the YES prong of block 260), however, the operation may obtain the next image and continue to block 200 to process the next image.

If one or more faces are detected (YES prong of block 235) by the face recognition algorithm, the operation may move to block 240 to determine the size and location of each face. The location of each face may refer to the blocks of pixels that make up the face on the image and the size may refer to the size of the block. For each of the detected faces, the operation may also determine if the face is smiling and if the eyes are open or blinking (block 245). Once face detection and analysis has been performed, a sharpness value may be calculated for each of the faces detected in the image (block 250). As discussed above, there are a variety of known procedures for calculating image sharpness values. Using one of these known procedures, the operation may calculate a separate sharpness value over each block of pixels detected as representing a face. After the face sharpness values are calculated, the operation moves to block 255 to retain the image along with its' processing data and continue to block 260 to determine if there are more images in the image set to process. If there are more images, the operation moves back to block 200 to repeat the process for the next image. If, however, there are no other images in the image set, the operation moves to block 305 of FIG. 3 to classify the image set.

In some embodiments, after all the images have been received and processed, before continuing to classify the image set, a ratio between the sharpness metric value of the sharpest image (i.e. identified in accordance with block 210) and each of the other captured images may be determined. Those images for which this ratio is less than some specified value, could be eliminated from further consideration as irrelevant. That is, only those images having a ratio value greater than a specified threshold would be considered for pre-selecting keeper images. One of ordinary skill in the art will recognize the selected threshold may be task or goal dependent and could vary from implementation to implementation. This is done to eliminate images that are of low quality and are not likely to be selected as keepers. Eliminating unwanted images can increase efficiency and speed up processing time. In other embodiments, images may be compared to each other to determine if there are images that are too similar too each other. If two such images are found, one may be eliminated from the set. This can also result in increased efficiency.

Operation 300, to classify the image set captured in the burst, begins by determining if the images contain primarily faces (block 305). This can be done, in one embodiment, by analyzing the data collected during the processing operation 120. If faces were detected during operation 120, the operation also calculated the size of each face in the images, as discussed above with respect to FIG. 3. In one embodiment, the sizes of the faces in an image may be added together for each image to calculate a total face size for that image. The total face size may then be compared to the total size of the image. If the total face size is above a certain threshold relative to the total size of the image, then the operation may determine that particular image contains primarily faces. If the total face size is below the threshold, the operation may decide that the image does not primarily contain faces. In one embodiment, the threshold value is 75% such that if the total face size is below %75 of the total image size, the image is considered as not containing primarily faces. It should be noted that other threshold values are also possible. Other approaches for determining if the images in the set contain primarily faces can also be used.

Figure 3:
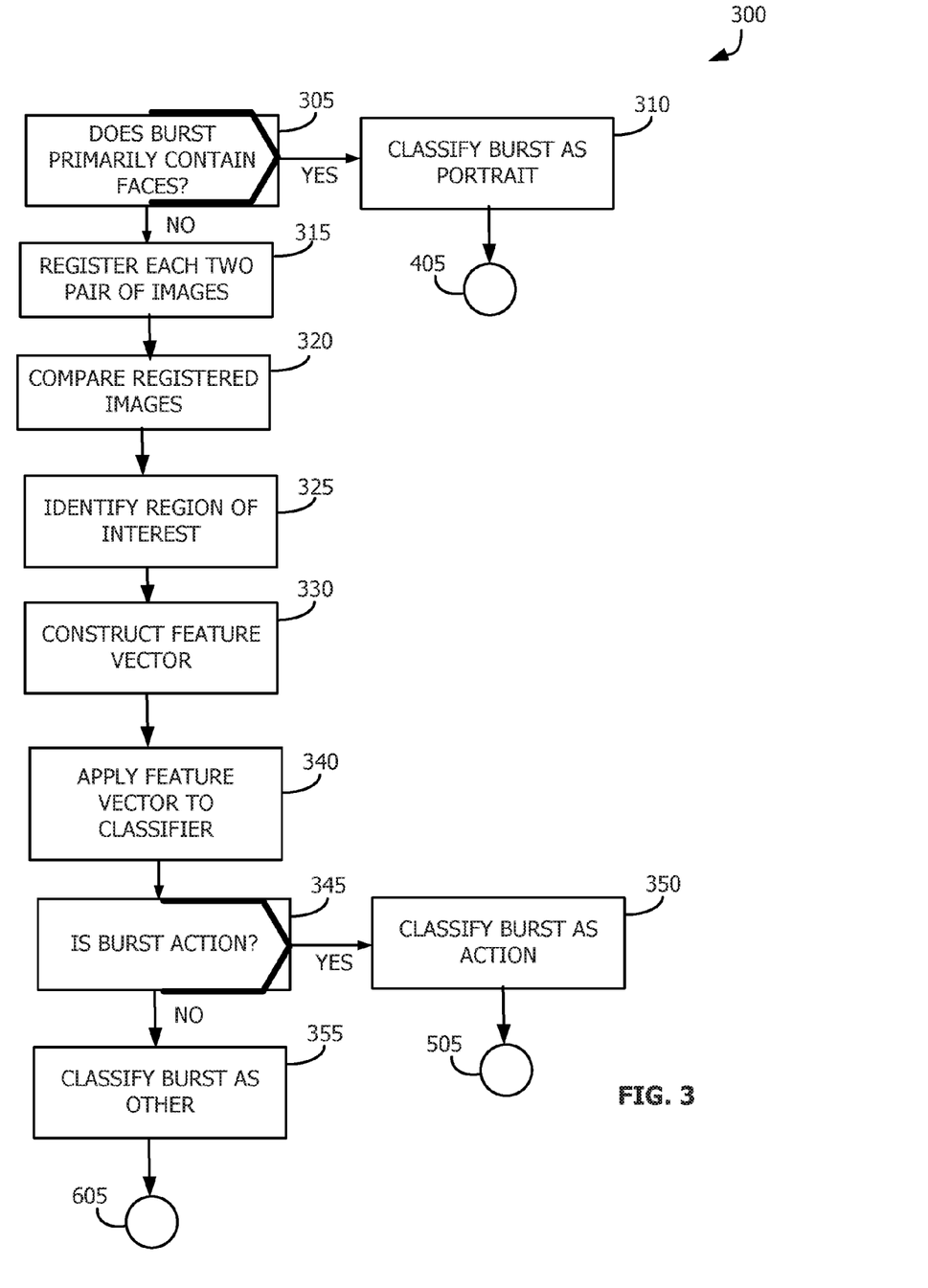
FIG. 3 shows, in flowchart form, a burst set classification operation in accordance with another embodiment.

In one embodiment, if the majority of the images in the image set contain primarily faces, then operation 300 may categorize the image set as a portrait set (block 310). In other embodiments if 50% or more of the images in the set contain primarily faces, the set is categorized as a portrait. Other configurations are also possible. When the burst is classified as a portrait, the operation moves to block 405 in FIG. 4 (operation 400) to pre-select a keeper image in a portrait image set.

If the image set is determined to not contain primarily faces (NO prong of block 305), then a region of interest may be identified in the image. This may be done in, one embodiment, by first registering each pair of images with respect to each other (block 315). There are a variety of well-known methods for registering images with respect to each other. U.S. patent application Ser. No. 13/911,793, entitled "Image Registration Methods for Still Image Stabilization," incorporated herein by reference, describes a few such methods.

In one embodiment, the registration may be performed by aligning the two signatures computed during processing of the images (see FIG. 2, block 230). After the two images have been registered, the registered images may be compared with each other to determine an area of the images where there is a large difference between them (block 320). The difference between the registered images may be referred to as registration error. In the embodiment, where registration is done by aligning the vertical and horizontal signatures, the comparison may occur by examining the differences between the registered vertical signatures and the registered horizontal signatures. If there is a large difference between these numbers, it is likely that a moving subject (i.e., local motion) was present in that region of the images. That is because generally background of an image dominates the number of pixels in the image. As a result, registration is likely to align the background of one image with respect to the other, such that there generally is no significant difference between the backgrounds in the registered images. When there is local motion due to, for example, motion of a foreground object, however, the difference between the images may be larger. Thus, registering the images with respect to one another and comparing the registered images with each other may identify local motion between the images. The area containing local motion may be identified as the region of interest (block 325). For example, in the embodiment using vertical and horizontal signatures, if the vertical signatures show that the two images have a large difference between their x columns (x1 and x2) and the horizontal signatures have a large difference between their y rows (y1 and y2), the region of interest may be identified as (x1, y1) and (x2, y2).

In one embodiment, the region of interest may be selected as a region in the images for which the registration error (i.e., the difference between the two registered images) is larger than a specified threshold. It will be understood, other procedures for identifying the region of interest are also possible. If no local motion can be identified (i.e., the difference between the registered images is small), then the entire image may be identified as the region of interest.

Once the registration error is determined and a region of interest identified, a feature vector may be constructed from multiple data values computed so far during the processing of the images (block 330). Each value may be considered as a feature which when combined together form a vector of values referred to as the feature vector. In one embodiment, one of the values used to form the feature vector may be the computed color histograms. The color histograms show how similar or different the images are to each other. Thus, if the color histograms show that the images are too different, it is likely that the scene contained some action. One of the other values that may be used in forming the feature vector is how large the registration errors are either in absolute value or in respect to each other. Other values that may be used are the L1 error of the Y channel between the images at the start and end of the burst and the average of the Euclidean norm of the registration translation between pairs of images (which may be a reasonable proxy for camera motion). Other types values may also be used to construct the feature vector.

Once a feature vector is constructed, the information from the feature vector may be input into a classifier, (block 340) such as a Support Vector Machine (SVM), an artificial neural network (ANN) or a Bayesian classifier to determine if the scene captured in the image set contains action. In one embodiment, prior to automated use, the classifier is trained with a set of training feature vectors already classified by hand. The classifier may return a binary decision indicating if the images contain action or not (block 345). If the decision indicates that the images contained action, the burst may be classified as an action burst (block 350) and the operation may continue to block 505 of operation 500 (FIG. 5) to pre-select keeper images in an action image set. If the classifier decision indicates that the images did not contain (enough) action, then the set may be classified as other (block 355) and the operation may continue to block 605 of operation 600 in FIG. 6 to determine the best image(s) in a set categorized as other.

Figure 4:
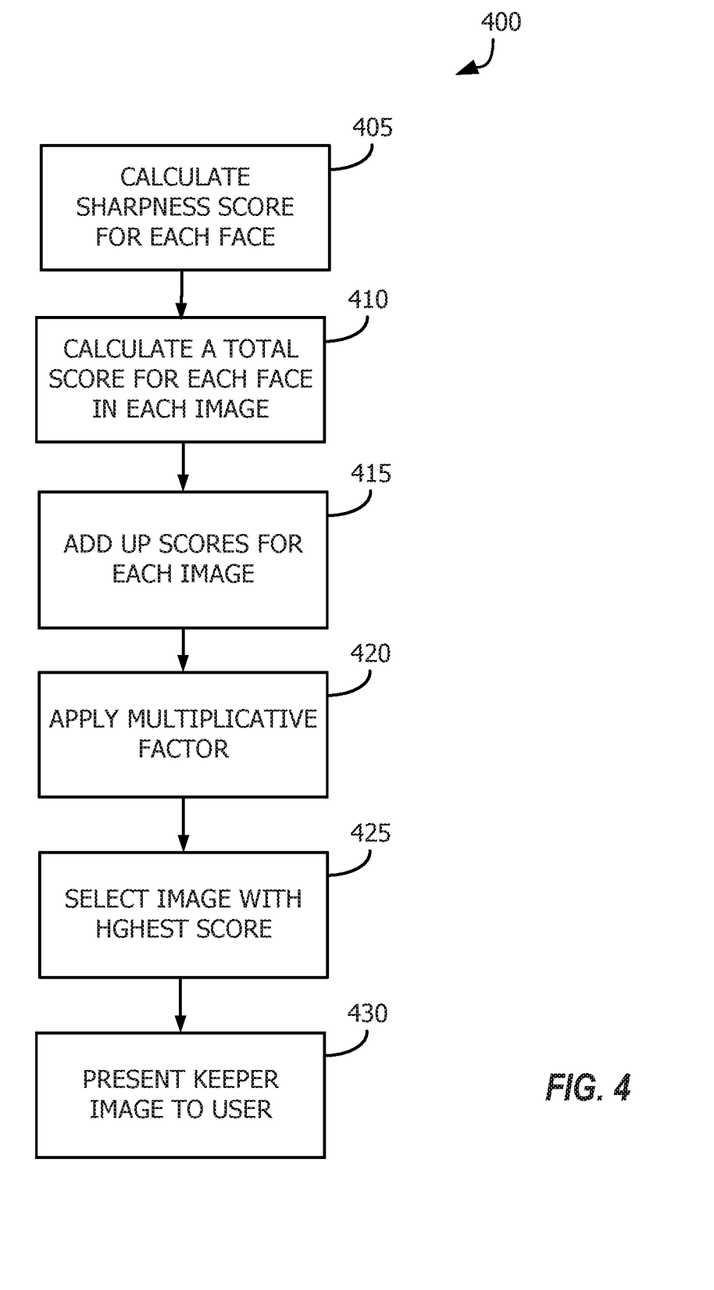
FIG. 4 shows, in flowchart form, a keeper image selection operation for a portrait burst in accordance with one embodiment.

Referring to FIG. 4, in one embodiment, operation 400 for pre-selecting keeper images in an image classified as a portrait set begins by calculating a sharpness score for each face in each image in the set (block 405). As discussed above, sharpness values for each face are generally calculated during processing operation 120 for each image. By normalizing those sharpness values, sharpness scores may be calculated for each face. Sharpness values are normalized over all the images in the set, by tracking each face as one subject across the image set. This may be done by first calculating an average sharpness value for each face across all the images in the set. The average sharpness value, in one embodiment, may be the sum of image gradients calculated over the eyes for the particular face across all the images in the set. Other ways of obtaining the average sharpness value are also possible. For example, the sharpness values for the face in each of the images in the set may be averaged to obtain the average sharpness value. Once the average sharpness value for each face is calculated, the sharpness value for the face in each image may be divided by the average sharpness value for that face to obtain a sharpness score for the respective face.

Once a sharpness score has been calculated for each face, a total score may be calculated for the face (block 410). The total score may be calculated by analyzing various categories of data collected during the processing of the images. Each category of data may be assigned a particular range of scores. For example, scores may be assigned for smiling faces and for non-blinking faces. In one embodiment, each category of data has a range of numbers available as options for scores for that category. A higher score may signify a better quality image. For example, data indicating that a face is smiling may result in a score of 10, while a non-smiling face may result in a score of zero. A non-blinking face may also receive a score of 10, while a blinking face may receive a score of zero. The sharpness score calculated is another category that may be taken into account for the total score. Other categories of data that may contribute to the total score include the location of the faces, e.g., whether or not the face is close to the edges of the image and the location of the area of the image occupied by the face. For example, being close to the edges of the image may receive a lower score, while being closer to the middle may receive a higher score. In one embodiment, rules of photographic composition, such as the rule of threes may be used to establish a preference for where faces should be located. The rule of threes is well known in the art. Scores for each of these categories may be assigned and then normalized before being added together to calculate the total score for a face. Once total scores for all of the faces in an image have been calculated, the total face scores may be added together to obtain a score for the image (block 415).

A multiplicative factor may then be applied to each image score (block 420). The multiplicative factor may be selected such that it makes the image score higher for images with faces. This results in a built-in preference for images with faces. Thus, if there are images in a set that do not contain any faces, they are less likely to be selected as keeper images. This is advantageous for an image set categorized as a portrait, as images without faces should not be selected as keepers for such a set. Once, the multiplicative factor has been applied to all the image scores, the image with the highest score may be selected as the keeper image for the burst (block 425) and may be presented to the user as such (block 430).

When faces are not detected in the image set, the set may be classified as an action or other type of set. For a set categorized as an action set, multiple images may be selected as keeper images. This is generally desirable in an action set, as the user may like to have the images tell the story of the action. To do this, the image set captured in the burst may be divided into various sections, and a keeper image may be selected from each section. Each section of the burst may contain images related to a specific sequence of actions in the scene. For example, if the burst captured was of a child diving into a pool from a diving board, the first section may include pictures of the child standing on the board, the second section may include pictures of the child in the air, and the third section may include pictures of the child in the water. In one embodiment, there is a maximum number of sections an image set may be divided into. For example, in an image set containing ten images, the maximum number may be three. The maximum number may be a preset in the image capture device or it may be an optional setting that the user can select.

Figure 5:
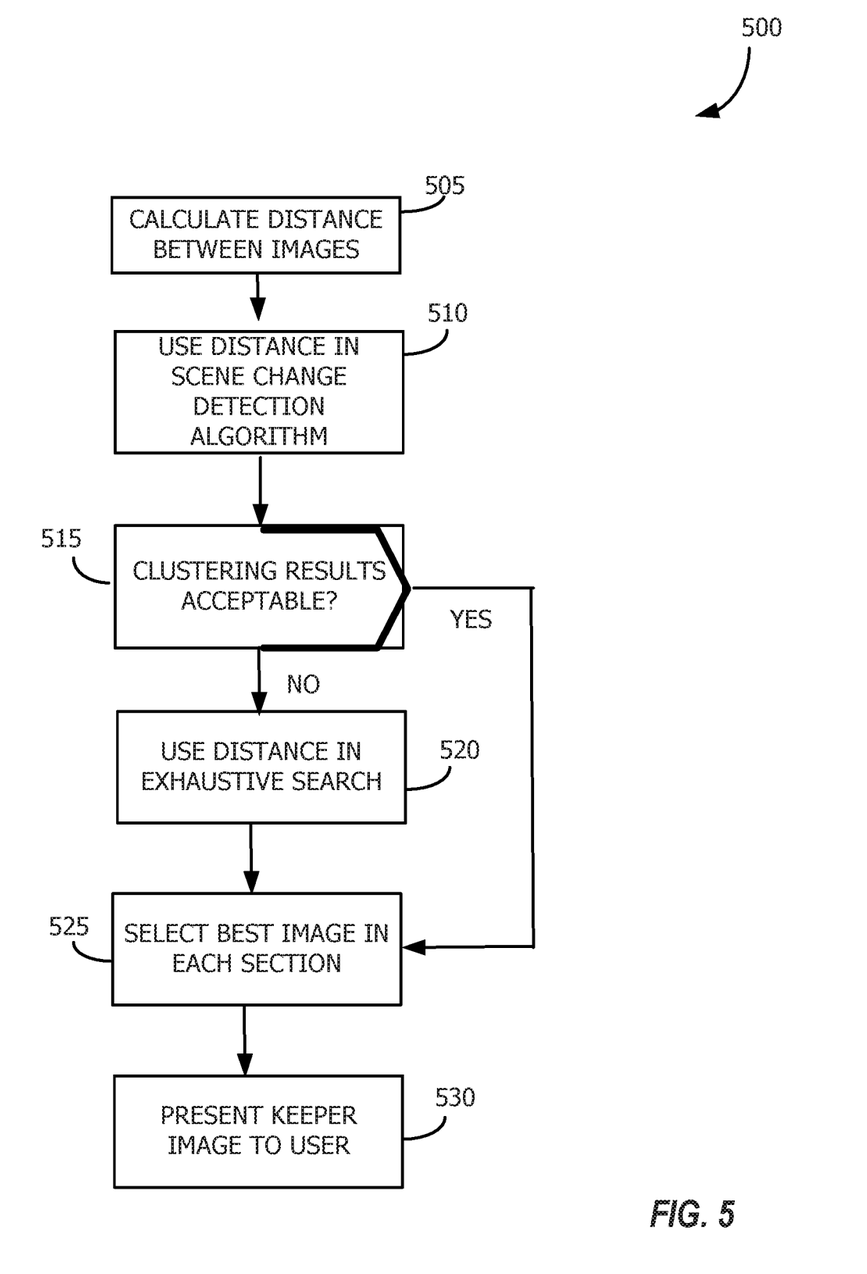
FIG. 5 shows, in flow-chart form, a keeper image selection operation for an action burst in accordance with one embodiment.

Referring to FIG. 5, in one embodiment, operation 500 to pre-select keeper images in an action set begins by calculating the distance between each pair of images in the image set (block 505). In one embodiment, the distance measured may be the Bhattacharyya distance of the two dimensional color histograms calculated during the processing operation 120. The calculated distance can then be used in a clustering model to divide the image set into different sections. Various clustering models are available for use in this approach. These include connectivity models such as hierarchical clustering (e.g., single-link, complete-link), centroid models (e.g., K-means algorithms), exhaustive search, and scene change detection algorithms. These clustering models and algorithms are well known in the art and thus not described in detail here.

In one embodiment, a scene change detection operation may first be used to cluster the image set into different sections (block 510). If the results from this operation are acceptable (YES prong of block 515), they are used. However, if the results are not acceptable, an exhaustive search operation may be used (block 520). An exhaustive search operation generally examines all the ways in which the set can be divided into a predetermined number of sections. The operation then attempts to optimize the ratio of average distance between images within a section to average distance between images from different sections. Based on the results of optimizing this ratio, the image set may be divided into different sections.

Once the set has been divided into different sections, an image from each section may be pre-selected as a keeper (block 525). This is done, in one embodiment, by comparing image quality metrics for all of the images in one section and selecting the image with the highest and/or best quality metrics. For example, sharpness and blurriness measures calculated during the processing operation 120 may be examined to select the sharpest and/or least blurry image. In practice, multiple images may have the same, or nearly the same, quality metric value. In such cases, the first image in each section having the highest quality metric value may be selected. In another embodiment, the last such image in the section may be selected. In still another embodiment, of those images having the highest quality metric value, that image closest to the middle of the image section may be selected. In yet another embodiment, if there are 'N' images having the highest quality metric value (e.g., are within a specified range of values from one another), a random one of the N images may be selected.

Figure 6:
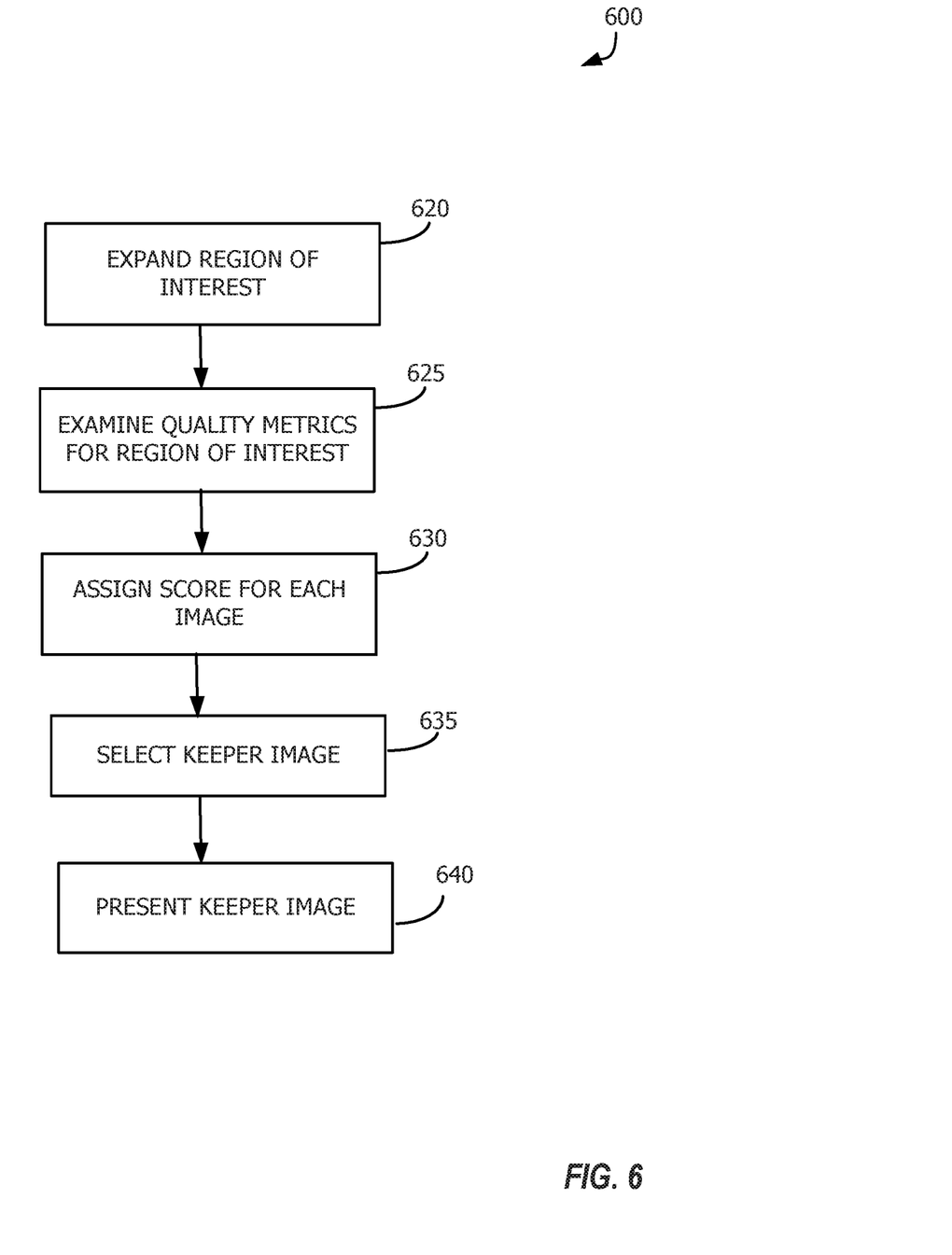
FIG. 6 shows, in flow-chart form, a keeper image selection operation in accordance with one embodiment.

In one embodiment, a keeper image from each section may be selected in accordance with the approach of operation 600 in FIG. 6. Once keeper images for each of the divided sections have been selected, they may be presented to the user for review and selection (block 530). In this manner, multiple images are pre-selected as keeper images to show various stages of an action scene in an action image set.

Referring back to FIG. 3, if the burst is not categorized as a portrait or an action, it may be classified as other. Other is a broad category that covers instances in which it cannot be determined why the user used the burst capture mode. It may not be possible to examine images captured in such a burst for the best faces or for action, but it is still possible to select one or more high quality images in the set as keeper images. One such approach involves identifying a best image through comparison of the region of interest of the images with each other. As discussed above, the region of interest is identified during the classification operation 300 (block 325).

To properly compare the region of interests in the images with each other, the region may first be expanded to cover all the blocks of the image that overlap with the region of interest (block 620). The blocks may correspond with the processing blocks of operation 120 for which quality metrics values were previously calculated, so that those metrics may be examined for the region of interest in each image in the image set (block 625). The quality metrics may include, in one embodiment, sharpness measures and blurriness metrics. After examining the quality metrics of the region of interests for all of the images in the set, the operation may assign a score to each image based on the various quality metrics examined (block 630). The scores may be assigned based on a range of numbers for each quality metric and added together to get a total score for each image. A keeper image may then be selected based on the total image score (block 635). This results, in one embodiment, in selecting the image having the best quality metrics for the region of interest as the keeper image. The keeper image may then be presented to the user for review and selection (block 640).

Figure 7:
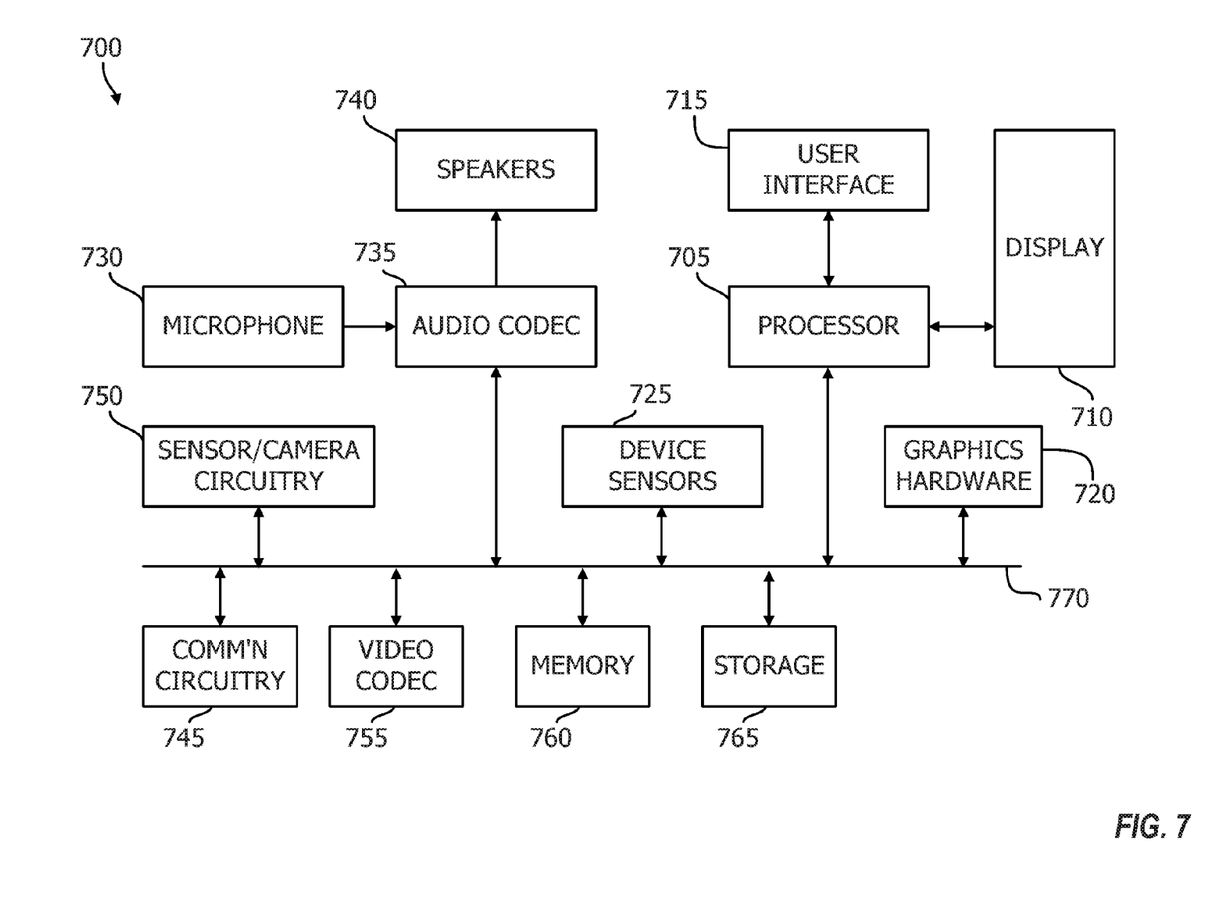
FIG. 7 shows, in block diagram form, a multi-function electronic device in accordance with one embodiment.

Referring to FIG. 7, a simplified functional block diagram of illustrative electronic device 700 is shown according to one embodiment. Electronic device 700 could be, for example, a mobile telephone, personal media device, portable camera, or a tablet, notebook or desktop computer system. As shown, electronic device 700 may include processor 705, display 710, user interface 715, graphics hardware 720, device sensors 725 (e.g., proximity sensor/ambient light sensor, accelerometer and/or gyroscope), microphone 730, audio codec(s) 735, speaker(s) 740, communications circuitry 745, image capture circuit or unit 750, video codec(s) 755, memory 760, storage 765, and communications bus 770.

Processor 705 may execute instructions necessary to carry out or control the operation of many functions performed by device 700 (e.g., such as the capture and/or processing of images in accordance with FIGS. 1-6). Processor 705 may, for instance, drive display 710 and receive user input from user interface 715. User interface 715 can take a variety of forms, such as a button, keypad, dial, a click wheel, keyboard, display screen and/or a touch screen. User interface 715 could, for example, be the conduit through which a user may select when to capture an image. Processor 705 may be a system-on-chip such as those found in mobile devices and include one or more dedicated graphics processing units (GPUs). Processor 705 may be based on reduced instruction-set computer (RISC) or complex instruction-set computer (CISC) architectures or any other suitable architecture and may include one or more processing cores. Graphics hardware 720 may be special purpose computational hardware for processing graphics and/or assisting processor 705 perform computational tasks. In one embodiment, graphics hardware 720 may include one or more programmable graphics processing units (GPUs).

Image capture circuitry 750 may capture still and video images that may be processed to generate images and may, in accordance with this disclosure, include specialized hardware to perform some or many of the actions described herein. Output from image capture circuitry 750 may be processed (or further processed), at least in part by video codec(s) 755 and/or processor 705 and/or graphics hardware 720, and/or a dedicated image processing unit (not shown). Images so captured may be stored in memory 760 and/or storage 765. Memory 760 may include one or more different types of media used by processor 705, graphics hardware 720, and image capture circuitry 750 to perform device functions. For example, memory 760 may include memory cache, read-only memory (ROM), and/or random access memory (RAM). Storage 765 may store media (e.g., audio, image and video files), computer program instructions or software, preference information, device profile information, and any other suitable data. Storage 765 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 760 and storage 765 may be used to retain computer program instructions or code organized into one or more modules and written in any desired computer programming language. When executed by, for example, processor 705 such computer program code may implement one or more of the methods described herein.

It is to be understood that the above description is intended to be illustrative, and not restrictive. The material has been presented to enable any person skilled in the art to make and use the inventive concepts as claimed and is provided in the context of particular embodiments, variations of which will be readily apparent to those skilled in the art (e.g., some of the disclosed embodiments may be used in combination with each other). For example, while FIGS. 1-6 have been described in the context of processing raw or unprocessed images, this is not necessary. Operations in accordance with this disclosure may be applied to processed versions of the captured images (e.g. edge-maps) or sub-sampled versions of the captured images (e.g. thumbnail images). In addition, some of the described operations may have their individual steps performed in an order different from, or in conjunction with other steps, presented herein. An example of this first difference would be performing actions in accordance with block 120 after one or more of the images are retained (e.g., block 255). An example of the latter difference would be the determination of quality metrics, e.g., in accordance with operation 120, as each image is captured (as implied in FIG. 2), after all images are captured, or after more than one, but less than all images have been captured. More generally, if there is hardware support some operations described in conjunction with FIGS. 1-6 may be performed in parallel.

In light of the above examples, the scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by one or more processors and comprising instructions stored thereon to cause the one or more processors to:
    obtain a temporal sequence of images of a scene from image data captured by a camera;
    determine, for each of the obtained images, at least one quality metric value;
    detect an indication of motion based on a comparison of the image data of two images of the temporal sequence of images;

determine, based on the indication of motion, whether the scene in the temporal sequence of images is an action scene;

select, based on the determination that the scene is an action scene, a keeper image based on a first technique, the first technique causing the one or more processors to:

divide the temporal sequence of images into two or more sections, in response to the determination that the scene contains action;

compare the at least one quality metric value of images within each section; and select, for each of the two or more sections, at least one image as a keeper image based on the comparison of the at least one quality metric value; and select, based on a determination that the scene is not an action scene, a keeper image based on a second technique.

2. The non-transitory program storage device of claim 1, wherein dividing the temporal sequence of images is based on detecting a scene change.

3. The non-transitory program storage device of claim 1, wherein the instructions further cause the one or more processors to:

calculate a distance between images of the temporal sequence of images, wherein the division of the temporal sequence of images is based on the calculated distance between the images.

4. The non-transitory program storage device of claim 3, wherein dividing the temporal sequence of images is based on a ratio of a first average distance between images within a section to a second average distance between images from different sections.

5. The non-transitory program storage device of claim 1, wherein the at least one quality metric value is indicative of at least one of sharpness and blurriness of the images.

6. The non-transitory program storage device of claim 1, wherein the instructions to cause the one or more processors to determine, for each obtained image of the temporal sequence of images, the at least one quality metric value further comprise instructions to cause the one or more processors to create a color histogram of the images in an UV color space.

7. The non-transitory program storage device of claim 1, wherein the instructions to cause the one or more processors to determine that the scene in the temporal sequence of images contains action comprise instructions to cause the one or more processors to:

construct a feature vector from the image of the temporal sequence of images; and apply the feature vector from each of the images to a classifier to determine whether the scene contains action.

8. The non-transitory program storage device of claim 7, wherein the instructions to cause the one or more processors to determine that the scene in the temporal sequence of images contains action further comprise instructions to cause the one or more processors to:

register one or more first images from the temporal sequence of images with one or more second images from the temporal sequence of images; and identify regions of interest between a first image and a second image, wherein the first image and the second image form an image pair, wherein a region of interest comprises a region in the first image and a corresponding region in the second image that exhibit a difference that is greater than a specified threshold, and wherein the feature vector of the first image of the image pair is indicative of a similarity in a distribution of color between the first image's region of interest and the second image's corresponding region of interest.

9. The non-transitory program storage device of claim 1, wherein each section of the two or more sections corresponds to at least one determined action in the temporal sequence of images.

10. A digital image capture device, comprising:

a memory;

a display communicatively coupled to the memory; and one or more processors communicatively coupled to the memory and display and configured to execute instructions stored in the memory comprising:

obtain a temporal sequence of images of a scene from image data captured by a camera;

determine, for each of the obtained images, at least one quality metric value;

detect an indication of motion based on a comparison of the image data of two images of the temporal sequence of images;

determine, based on the indication of motion, whether the scene in the temporal sequence of images is an action scene;

select, based on the determination that the scene is an action scene, a keeper image based on a first technique, the first technique causing the one or more processors to:

divide the temporal sequence of images into two or more sections, in response to the determination that the scene contains action;

compare the at least one quality metric value of images within each section; and select, for each of the two or more sections, at least one image as a keeper image based on the comparison of the at least one quality metric value; and select, based on a determination that the scene is not an action scene, a keeper image based on a second technique.

11. The device of claim 10, wherein dividing the temporal sequence of images is based on detecting a scene change.

12. The device of claim 10, wherein the instructions further comprising:

calculate a distance between images of the temporal sequence of images, wherein the division of the temporal sequence of images is based on the calculated distance between the images.

13. The device of claim 12, wherein dividing the temporal sequence of images is based on a ratio of a first average distance between images within a section to a second average distance between images from different sections.

14. The device of claim 10, wherein the at least one quality metric value is indicative of at least one of sharpness and blurriness of the images.

15. The device of claim 10, wherein determining, for each obtained image of the temporal sequence of images, the at least one quality metric value further comprises creating a color histogram of the images in an UV color space.

16. The device of claim 10, wherein determining that the scene in the temporal sequence of images contains action further comprises:

construct a feature vector from each image of the temporal sequence of images; and apply the feature vector from each of the images to a classifier to determine whether the scene contains action.

17. A method for processing images, comprising:

obtaining a temporal sequence of images of a scene from image data captured by a camera;

determining, for each of the obtained images, at least one quality metric value;

detecting an indication of motion based on a comparison of the image data of two images of the temporal sequence of images;

determining, based on the indication of motion, whether the scene in the temporal sequence of images is an action scene;

selecting, based on the determination that the scene is an action scene, a keeper image based on a first technique, the first technique comprising:

dividing the temporal sequence of images into two or more sections, in response to the determination that the scene contains action;

comparing the at least one quality metric value of images within each section; and selecting, for each of the two or more sections, at least one image as a keeper image based on the comparison of the at least one quality metric value; and selecting, based on a determination that the scene is not an action scene, a keeper image based on a second technique.

18. The method of claim 17, wherein dividing the temporal sequence of images is based on detecting a scene change.

19. The method of claim 17, further comprises:

calculating a distance between images of the temporal sequence of images, wherein the division of the temporal sequence of images is based on the calculated distance between the images.

20. The method of claim 19, wherein dividing the temporal sequence of images is based on a ratio of a first average distance between images within a section to a second average distance between images from different sections.

21. The non-transitory program storage device of claim 1, wherein the second technique comprises a face detection technique.

22. The device of claim 10, wherein the second technique comprises a face detection technique.

23. The method of claim 17, wherein the second technique comprises a face detection technique.

* * * * *

UNITED STATES PATENT AND TRADEMARK OFFICE
CERTIFICATE OF CORRECTION

PATENT NO. : 10,523,894 B2
APPLICATION NO. : 15/266460
DATED : December 31, 2019
INVENTOR(S) : Brett Keating et al.

It is certified that error appears in the above-identified patent and that said Letters Patent is hereby corrected as shown below:

In the Claims

Claim 7, Column 13, Line 51: Replace the phrase "construct a feature vector from the image" with the phrase --construct a feature vector from each image--.

Signed and Sealed this
Eighteenth Day of February, 2020

Andrei Iancu
*Director of the United States Patent and Trademark Office*